(12) United States Patent
Allais et al.

(10) Patent No.: US 10,221,106 B2
(45) Date of Patent: Mar. 5, 2019

(54) PROCESS FOR PREPARING A UREA-SULPHUR FERTILISER

(71) Applicant: SHELL OIL COMPANY, Houston, TX (US)

(72) Inventors: Cyrille Paul Allais, Amsterdam (NL); Klaas Jan Hutter, Pocatello, ID (US); Rafael Alberto Garcia Martinez, Calgary (CA); Charles James Ingoldsby, Calgary (CA); Carlos Moreira Tomaz, Rio de Janeiro (BR); Jason Trevor O'Brien, Pinkenba (AU)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/329,059

(22) PCT Filed: Jul. 24, 2015

(86) PCT No.: PCT/EP2015/067073
§ 371 (c)(1),
(2) Date: Jan. 25, 2017

(87) PCT Pub. No.: WO2016/016150
PCT Pub. Date: Feb. 4, 2016

(65) Prior Publication Data
US 2017/0210675 A1 Jul. 27, 2017

Related U.S. Application Data

(60) Provisional application No. 62/029,600, filed on Jul. 28, 2014.

(51) Int. Cl.
*C05C 9/00* (2006.01)
*C05G 3/00* (2006.01)
*C05D 9/02* (2006.01)

(52) U.S. Cl.
CPC .............. *C05C 9/00* (2013.01); *C05C 9/005* (2013.01); *C05D 9/02* (2013.01); *C05G 3/0058* (2013.01)

(58) Field of Classification Search
CPC ...................................................... C05C 9/00
See application file for complete search history.

(56) References Cited

U.S. PATENT DOCUMENTS

| 3,100,698 A | 8/1963 | Horsley et al. |
| 3,519,413 A | 7/1970 | Trimbach et al. |

(Continued)

FOREIGN PATENT DOCUMENTS

| CA | 811080 | 4/1969 |
| CN | 1628084 | 6/2005 |

(Continued)

OTHER PUBLICATIONS

International Search Report for PCT/EP2015/067073 dated Oct. 5, 2015; 4 pages.

*Primary Examiner* — Wayne A Langel (57) ABSTRACT

A process for the manufacture of a urea-sulphur fertiliser composition, the process comprising providing feeds comprising elemental sulphur, urea, and optionally a surfactant, such as a multifunctional ionic surfactant; merging the feeds in order to obtain a combined feed; passing the combined feed through a mixing stage in order to obtain a mixed feed; and passing the mixed feed through a processing stage in order to obtain the urea-sulphur fertiliser composition. Compositions obtained by the process are also provided.

7 Claims, 11 Drawing Sheets

(56) References Cited

U.S. PATENT DOCUMENTS

| | | | |
|---|---|---|---|
| 3,697,245 A | 10/1972 | Dilday | |
| 3,725,029 A | 4/1973 | Blackmore | |
| 4,330,319 A | 5/1982 | Bexton et al. | |
| 4,372,872 A | 2/1983 | Backlund | |
| 4,832,728 A | 5/1989 | Allan et al. | |
| 9,598,322 B2 * | 3/2017 | Allais | C05C 9/005 |
| 2007/0095118 A1 | 5/2007 | Evers et al. | |
| 2010/0288005 A1 | 11/2010 | Schromm et al. | |
| 2012/0036906 A1 | 2/2012 | Pedersen | |
| 2012/0128981 A1 | 5/2012 | Iyer | |

FOREIGN PATENT DOCUMENTS

| | | |
|---|---|---|
| CN | 101402532 | 4/2009 |
| CN | 101967070 | 2/2011 |
| NZ | 213682 | 10/1985 |
| WO | 2003106376 | 12/2003 |
| WO | 2010058038 | 5/2010 |
| WO | 2010086395 | 8/2010 |
| WO | 2010086396 | 8/2010 |
| WO | 2010102389 | 9/2010 |
| WO | 2011015306 | 2/2011 |
| WO | 2012118532 | 9/2012 |
| WO | 2013098404 | 7/2013 |
| WO | 2014009326 | 1/2014 |
| WO | 2015017329 | 2/2015 |
| WO | 2015104286 | 7/2015 |
| WO | 2015104293 | 7/2015 |
| WO | 2015104296 | 7/2015 |

* cited by examiner

PROCESS FOR PREPARING A UREA-SULPHUR FERTILISER

PRIORITY CLAIM

The present application is the National Stage (§ 371) of International Application No. PCT/EP2015/067073, filed Jul. 24, 2015, which claims priority from U.S. Patent Application No. 62/029,600, filed Jul. 28, 2014, incorporated herein by reference.

FIELD OF THE INVENTION

The present invention provides a process for the preparation of urea-sulphur compositions that are commonly used as fertilisers and/or soil improvers.

BACKGROUND OF THE INVENTION

Urea is commonly used as a fertiliser, supplying nitrogen to plants. Many soils also require sulphur as a plant nutrient, so fertilisers containing both urea and elemental sulphur have been developed. Desirably the elemental sulphur needs to be present as small dispersed particles to allow its oxidation in the soil to the plant available sulphate ion.

U.S. Pat. No. 3,100,698 discloses a urea-sulphur fertiliser that is made by combining molten urea and molten sulphur and subjecting the mixed melt to a prilling process. The mixed melt can also be prepared by adding solid urea prills to molten sulphur, or by adding solid sulphur to molten urea.

Melting sulphur and melting urea can be an energy intensive and therefore costly process, and can require sizeable equipment. Additionally, if melting of urea is not done quickly and in a controlled manner (i.e. the temperature is controlled such that it does not significantly exceed the melting point of urea), there is a risk of urea degradation. In particular, there is a risk of biuret production. Biuret is the condensation product of two molecules of urea and is a phytotoxin: a material that is toxic to plants. It can be formed when urea is heated or maintained at an elevated temperature for long periods of time. Biuret interferes with nitrogen metabolism and protein synthesis in plants. It is desirable, therefore, to minimise or at best eliminate the amount of biuret in compositions intended for use as fertilisers or soil improvers.

Further, when molten urea and molten sulphur are mixed, reactions may take place leading to the formation of impurities such as Thiourea. Thiourea is toxic for aquatic systems and a suspected carcinogen. Thiourea can be generated by the reaction of the dissolved hydrogen sulphide and polysulphides in sulphur and urea. The extent of the formation of these impurities is influenced by the time required to co-process molten urea and molten sulphur. Minimizing the mixing of molten urea and molten sulphur is hence key when processing these materials. The present inventors have sought to provide an improved process for the preparation of urea-sulphur fertiliser which is desirably simpler and more energy efficient than known processes. Preferably the process will allow for minimising the time at which urea is maintained at an elevated temperature and, thus, the reducing formation of biuret in the fertiliser compositions.

SUMMARY

In a first aspect, the invention provides a process for the manufacture of a urea-sulphur fertiliser composition, the process comprising:

(a) providing a first feed comprising elemental sulphur, and providing a second feed comprising urea;
(b) merging the first and second feeds in order to obtain a combined feed;
(c) passing the combined feed through a mixing stage in order to obtain a mixed feed; and
(d) passing the mixed feed through a processing stage in order to obtain a urea-sulphur fertiliser composition.

In an embodiment of the invention the step (a) may comprise a third feed that comprises a surfactant, suitably a multifunctional ionic surfactant.

Suitably, the first, second and, if present, the third feeds may be merged substantially simultaneously in order to form the combined feed. In a specific embodiment of the invention, the mixing stage comprises at least one mixer selected from a static mixer or a dispersion mill, optionally the dispersion mill is a high shear dispersion mill. In a particular embodiment of the invention, the mixing stage comprises a plurality of mixers. Suitably, the plurality of mixers are arranged either in series or in parallel.

A second aspect of the invention provides a process for the manufacture of a urea-sulphur fertiliser composition, the process comprising:

(a) providing a first feed comprising elemental sulphur, and a second feed comprising urea;
(b) merging the first and second feeds in order to obtain a first combined feed;
(c) passing the first combined feed through a plurality of mixing stages arranged in a parallel configuration in order to obtain a plurality of mixed feeds; and
(d) passing each of the plurality of mixed feeds through a processing stage in order to obtain a urea-sulphur fertiliser composition.

In a specific embodiment of the invention, the plurality of mixing stages comprises at least one mixer selected from: a static mixer; and a dispersion mill, optionally the dispersion mill is a high shear dispersion mill.

Typically, the processing stage may comprise one or more of the steps selected from the group consisting of: drying; granulating; pastillating; and sorting.

In embodiments of the invention the plurality of mixing stages is selected from: at least two, suitably greater than three, optionally at least four.

Typically, the processing stages of any aspect of the invention may comprise one or more of the steps selected from the group consisting of: drying; granulating; pastillating; and sorting.

In an embodiment of the invention the step (a) may include providing a third feed comprising a surfactant, suitably a multifunctional ionic surfactant.

Optionally the process may further comprise adding one or more plant micronutrients to the combined or mixed feed, wherein the plant micronutrients are selected from one or more of the group consisting of: boron; selenium; sodium; zinc; manganese; iron; copper; molybdenum; cobalt; calcium; and magnesium.

In a specific embodiment of the invention, one or more of the first, second and, if present, the third feeds is in liquid form. Suitably, either or both of the sulphur and urea may be in molten form.

In a specific embodiment of the invention, a fourth feed comprising urea is merged with the mixed feed in order to provide a combined mixed feed. Suitably, the fourth feed comprises molten urea. Optionally, the combined mixed feed may be passed through a further mixing stage before the processing stage, with mixers are described above arranged in series or in parallel configurations.

A third aspect of the invention provides for a urea-sulphur fertiliser composition obtained/obtainable by the methods described herein.

BRIEF DESCRIPTION OF THE DRAWINGS

The invention is further illustrated by reference to the following drawings in which:

FIG. 4 shows process flow diagrams of an embodiment of the invention in which a plurality of static mixers is arranged in parallel, in (A) the output from the mixers is combined before progressing to a processing stage, whilst in (B) the output from the mixers is not combined and each is processed separately;

FIG. 6 shows process flow diagrams of an embodiment of the invention in which a plurality of dispersion mill mixers is arranged in parallel, in (A) the output from the mixers is combined before progressing to a processing stage, whilst in (B) the output from the mixers is not combined and each is processed separately;

DETAILED DESCRIPTION OF THE INVENTION

The present process provides for improved methods and arrangements for mixing components of a sulphur fertiliser that also comprises urea in order to form a final granular product. Alternatively, the mixed components can be applied as a coating and/or fattening agent to a sold substrate, such as a particle.

The sulphur that is supplied to the process can be obtained from any suitable source. The sulphur may be high purity (>99.9% S) chemical sulphur as obtained from the Claus process. However, the process of the present invention can use sulphur of significantly lower purity than this. Examples of such sulphur sources are sulphur filter cake as obtained from sulphur melting and filtration operations and sulphur obtained from a various chemical and biological $H_2S$ gas removal processes. Typically, such sulphur sources may contain anywhere in the range of from 30 to 99.9 wt %, preferably from 50 to 99.5 wt %, more preferably from 60 to 99.0 wt %, sulphur.

Sulphur used in the process of the present invention may be supplied in solid or molten form. The solid sulphur may be added as granules, pellets, slates, powder or any other solid form. Solid sulphur may also be provided in the form of a liquid suspension, for example as a slurry. The liquid component of the slurry may be an aqueous liquid. Aqueous liquid may be an acidic aqueous solution such as an aqueous solution of phosphoric acid or sulphuric acid, and is most preferably selected from an aqueous solution of phosphoric acid, an aqueous solution of ammonium phosphate, an aqueous solution of ammonium sulphate and a combination thereof. In case the liquid is an aqueous solution of phosphoric acid, the phosphoric acid preferably has a strength corresponding to from 1 to 60% of $P_2O_5$ in water, more preferably from 5 to 50%. Preferably the aqueous liquid contains as little water as possible to avoid the introduction of excess process water; any excess water that is introduced into the fertiliser production process is to be eliminated at a later stage and thereby leads to a more complex and more energy intensive process.

It is optional for a proportion of the sulphur to be provided in molten form and a portion to be in sold form.

Urea used in the process of the invention may be supplied in either solid or molten form. Solid urea is suitably supplied as urea prills.

In specific embodiments of the invention the sulphur is present at least 1 wt %, suitably at least 7 wt %, typically at least 15 wt %, more typically at most around 20 wt %, or suitably up to around 40 wt % of the total weight of the fertiliser, with the balance comprising urea and any additional additives.

It is known that reduction of elemental sulphur concentration in dusts generated during manufacturing and handling of sulphur-containing fertilisers, and its associated hazards (e.g. respiratory and explosion risks) can be achieved during the production of sulphur-containing phosphate-based fertilisers, if at least one surfactant is added and dispersed throughout the fertiliser composition during production. Surfactants can also act as emulsifiers, thereby assisting in the mixing and blending steps of the invention. Hence, according to an embodiment of the present invention at least one surfactant used in the process of the present invention includes a multifunctional ionic surfactant.

In the context of the present invention a multifunctional ionic surfactant is defined as an ionic surfactant which has two or more functional properties. Suitably, the multifunctional ionic surfactant to be used in accordance with the present invention reduces the viscosity of the elemental sulphur dispersion produced. Moreover, it stabilizes the emulsion formed through coating of individual elemental sulphur particles thus providing a stable, non-coalescing and non-agglomerating dispersion of micro-encapsulated sulphur particles in further processing steps.

Optionally, the multifunctional ionic surfactant comprises an anionic surfactant. Examples of suitable anionic surfactants include soaps, sulphates, sulphonates, phosphites, phosphates, phosphonates, ionic polymeric surfactants, and lignosulphonates. Preferably, the multifunctional ionic surfactant comprises a material derived from the Lignin family of chemicals such as a lignosulphonate. Examples of suitable lignosulphonates include ammonium lignosulphonate, sodium lignosulphonate, calcium lignosulphonate, potassiun lignosulphonate. Preferably, the lignosulphonate comprises calcium lignosulphonate.

Suitably, the at least one surfactant is present in an amount of at least 0.0001 wt. %, optionally at least 0.001 wt. %, more suitably at least 0.005 wt. %, even more suitably at least 0.008 wt. %, yet even more suitably at least 0.01 wt. % with respect to the weight of the overall fertiliser composition. Typically, the at least one surfactant is present in an amount of at most 3 wt. %, optionally at most 2 wt. %, more suitably 0.1 wt. %, even more suitably at most 0.09 wt. %, even more suitably at most 0.08 wt. %, even more suitably at most 0.07 wt. % and typically at most 0.05 wt. % with respect to the weight of the overall fertiliser composition.

The surfactant may be in solid form or provided in the form of a liquid solution. Suitably, the liquid solution is an aqueous solution. In a specific embodiment of the invention the surfactant comprises. Other ingredients may be incorporated into the fertiliser compositions of the present invention, in order to tailor the fertiliser composition to its intended end-use. Examples include plant micronutrients such as boron, selenium, sodium, zinc, manganese, iron, copper, molybdenum, cobalt, calcium, magnesium and combinations thereof. These nutrients may be supplied in elemental form or in the form of salts, for examples as sulphates, nitrates, oxides or halides. In this way, granules enriched in plant nutrients are obtained. The amount of plant micronutrients depends on the type of fertiliser needed and is typically in the range of from 0.1 to 5 wt. %, based on the total weight of the granules.

According to an embodiment of the invention the process comprises a method for manufacturing a fertiliser composition that comprises at least sulphur, urea and optionally a minor amount of a surfactant. The term "comprises" as used herein is intended to indicate that as a minimum the recited components are included but that other components that are not specified may also be included as well. All three components may be in solid form, alternatively one or more of the components may be in liquid form. Use of the term 'liquid' is intended to include any of: a molten form, a suspension of solid in a liquid including an emulsion, or as a solution (where appropriate under the specified process conditions). Where the components are in solution, it is optional for the solvent to be selected from a polar solvent, such as but not limited to water.

Figure 1:
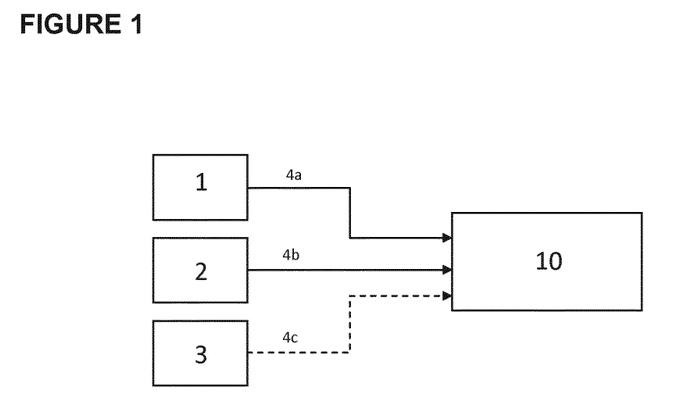
FIG. 1 shows a process flow diagram of a conventional process line up.

As shown in FIG. 1, a basic process for preparing a fertiliser composition can comprise providing three primary feeds (1-3) directly to a mixing, processing and forming device (10). The primary feeds can comprise an elemental sulphur feed (1); a urea feed (2); and optionally a surfactant feed (3). The mixing device comprised within the mixing stage of the process may be in the form of a static mixer or, alternatively, a dispersion mill. Feed and product may be conveyed between mixing and processing stages by way of pumps and/or gravity feed as appropriate.

Static mixers may comprise tubular static mixers or plate mixers both of which comprise non-moving mixing elements, such as one or more baffles, located therein. In use, the feedstreams that are to be mixed are introduced into or through the static mixer and as the streams move through the mixer the non-moving mixing elements continuously blend the materials in the feedstream together. Complete mixing may depend on variables including the material properties of the feedstreams, tube inner diameter, number of static mixing elements and their design. Typically an arrangement of helical elements in a tubular static mixer can simultaneously produce patterns of flow division and radial mixing.

A dispersion mill typically has a slotted rotor inside a slotted stator. When the rotor and stator slots come into alignment, the liquid and elemental sulphur are ejected from the rotor slots into the stator slots. Suitable dispersion mills are described in U.S. Pat. No. 5,522,553 and are available from Kady International, USA. The rotor turns at very high speeds, preferably such that the tip speed is from 1500 to 3500 meters per minute, more preferably from 2000 to 3000 meters per minute. Higher tip speeds result in a higher energy input in the dispersion mill and result in a smaller average particle size. Higher tip speeds also cause higher shear forces, hence these devices are typically referred to as high shear dispersion mills. The speed should be sufficiently high to achieve the required particle size. The feed materials are drawn by the rotation of the rotor into the rotor/stator assembly, and are accelerated and expelled radially through the openings in the slotted stator. With each pass through the rotor/stator assembly, the feed components are subjected to a combination of mechanical and hydraulic shear such that the combined product particles are reduced in size.

A disadvantage associated with providing three separate feeds directly to the mixer is that it can often lead to non-ideal mixing within the device. In some instances a proportion of the feed will bypass mixer components, such as the micronisation head in a high shear dispersion mill, thereby resulting in a lack of homogeneity in the product composition. Clearly this is undesirable, particularly as the production line operates a continuous process so that interruption to correct mixing imbalances should eliminated or kept to an absolute minimum.

The present inventors have found that improved mixing and product homogeneity can be achieved by combining one or more of the feedstreams prior to the mixing step. Typically, improved results are obtained when the feedstreams for the majority components at least of the product, i.e. sulphur and urea, are combined prior to a mixing step. Suitably, all feedstream components may be combined prior to mixing.

Figure 2:
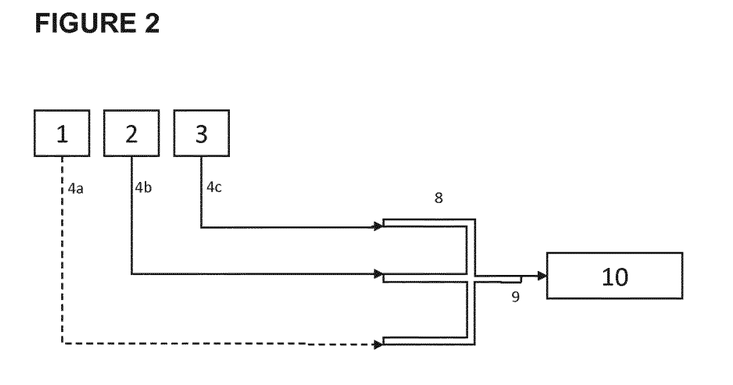
FIG. 2 shows a process flow diagram of an embodiment of the invention.

In a specific embodiment of the invention, as shown in FIG. 2, feedstreams comprising sulphur (1), urea (2) and optionally a surfactant (3) pass along feed lines (4a-c) to a mixing T (8) which merges the feed lines (4a-c) into a single combined feedline (9). The combined feedline (9) then leads to one or more additional mixing, processing and forming stages (10) where it is converted into fertiliser product, or alternatively applied as a coating agent.

Figure 3:
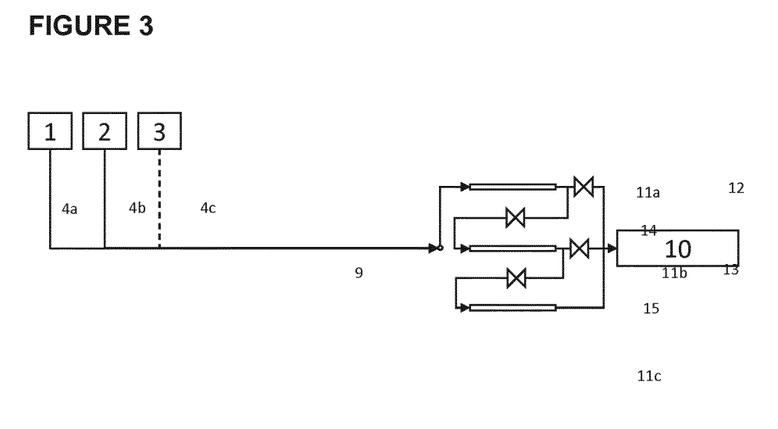
FIG. 3 shows a process flow diagram of an embodiment of the invention in which a plurality of static mixers is arranged in series.

FIG. 3 relates to an embodiment of the invention in which feedstreams of sulphur (1), urea (2) and optionally a surfactant (3) pass along feed lines (4a-c) which merge into a combined feedline (9). The combined feedline (9) proceeds to a arrangement comprising a plurality of static mixers arranged in series. It will be understood that the term "plurality" as used herein refers to two or more in number. In the embodiment shown in FIG. 3, a trio of static mixers (11a-c) are arranged in series (i.e. proceeding one after the other in a nose-to-tail configuration) along the combined feed line (9). Control valves (14,15) may be placed between the static mixers in order to control the rate of flow of the feed. Additional valves (12,13) may be provided in order to divert feed directly to one or more additional mixing, processing and forming stages (10) where it is converted into fertiliser product. Inclusion of divert valves (12,13) in the combined feedline (9) introduces additional flexibility into the process line up that enables one or more static mixer to be bypassed. This may show advantage in cases where the process is required to operate at less than full capacity, thereby allowing for the mixing stage to be truncated as needed. Such acute control of the mixing stage also permits the additional advantage of finer control of particle size of the resulting mixed feedstreams.

Figure 4A:
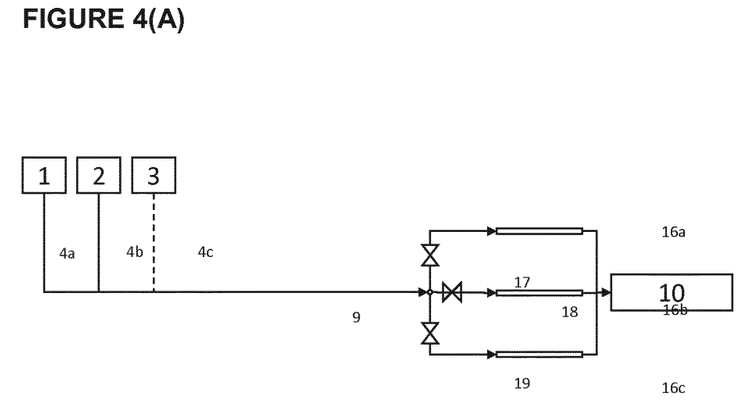
Figure 4B:
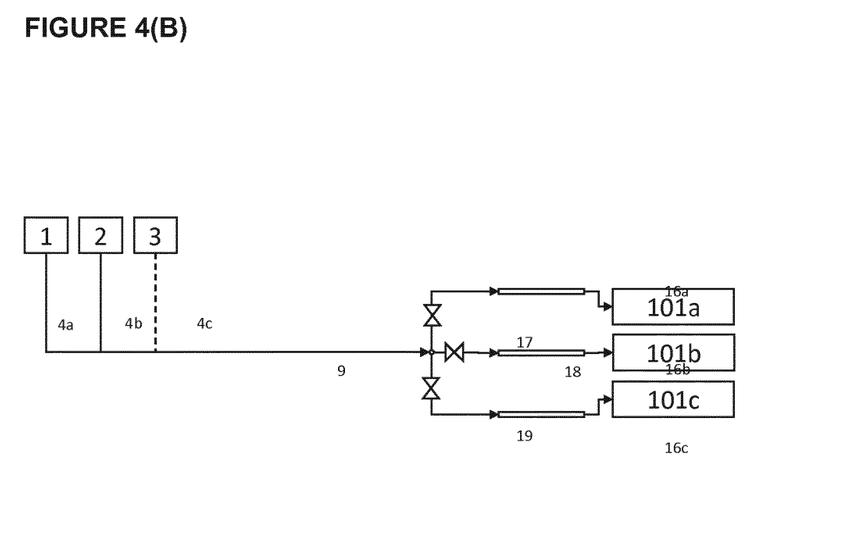

An alternative arrangement is shown in FIG. 4(a), in which feedstreams of sulphur (1), urea (2) and optionally a surfactant (3) pass along feed lines (4a-c) which merge into a combined feedline (9). The combined feedline (9) proceeds to an arrangement comprising a plurality of static mixers arranged in parallel. In the embodiment shown in FIG. 4 (*a*), a trio of static mixers (16*a-c*) is arranged in parallel (i.e. substantially side-by-side) upstream of processing and forming stages (10) where the feed is converted into fertiliser product. Control valves (17-19) allow for the feedstream from the feedline (9) to be diverted as and if required. This additional level of control permits acute management of mixing parameters and is advantageous when the process is required to operate at less than full capacity. A further embodiment of the invention is shown in FIG. 4(*b*) which is substantially similar to the embodiment set out in FIG. 4(*a*) except that the output of the parallel static mixers (16*a-c*) is not merged into a single feedline prior to the additional processing and forming stages (10). In the arrangement set out in FIG. 4(*b*) the outputs from the static mixers (16*a-c*) are kept separate and proceed to discreet forming/processing stages (101*a-c*). In this way the static mixers (16*a-c*) need not all be configured to give the same output in terms of particle size, particle grade, capacity or other mixing parameters. This affords a level of additional flexibility to the process that enables a plurality of separate and discreet product lines to be derived from a single common feedstream.

Figure 5:
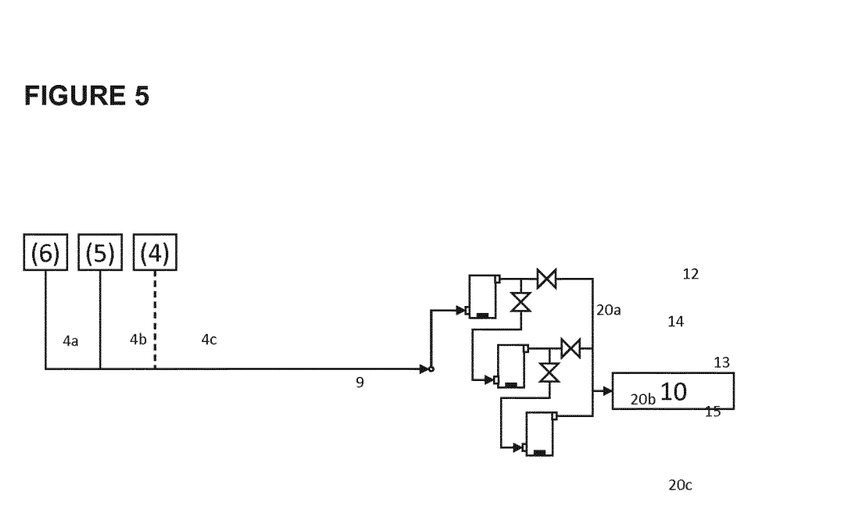
FIG. 5 shows a process flow diagram of an embodiment of the invention in which a plurality of dispersion mill mixers is arranged in series.

FIG. 5 shows an embodiment of the invention in which feedstreams of sulphur (1), urea (2) and optionally a surfactant (3) pass along feed lines (4*a-c*) which merge into a combined feedline (9). The combined feedline (9) proceeds to an arrangement comprising a plurality of high shear rotary mixers arranged in series. In the embodiment shown in FIG. 5, a trio of rotary mixers (20*a-c*) is arranged in series (i.e. proceeding one after the other in a nose-to-tail configuration) along the combined feed line (9). Control valves (14,15) may be placed between the rotary mixers in order to control the rate of flow of the feed. Additional valves (12,13) may be provided in order to divert feed directly to one or more additional mixing, processing and forming stages (10) where it is converted into fertiliser product. Inclusion of divert valves (12,13) in the combined feedline (9) introduces additional flexibility into the process line up that enables one or more rotary mixer to be bypassed. An advantage of this arrangement is that it permits additional levels of control over process parameters, mixing and product grade. In addition, the use of high shear rotary mixers can lead to an increase in heat of the mixed feed due to friction forces. Uncontrolled increases in heat are known to contribute to formation of undesirable contaminants such as thiourea and biuret. Hence, the control valves (12-15) enable the feedstream to be diverted away from additional high shear mixing stages in cases of excessive or unwanted heat build up.

Figure 6A:
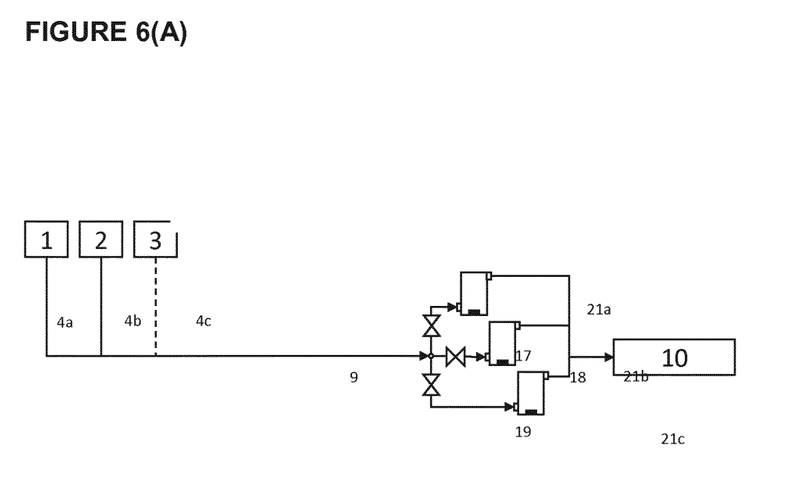
Figure 6B:
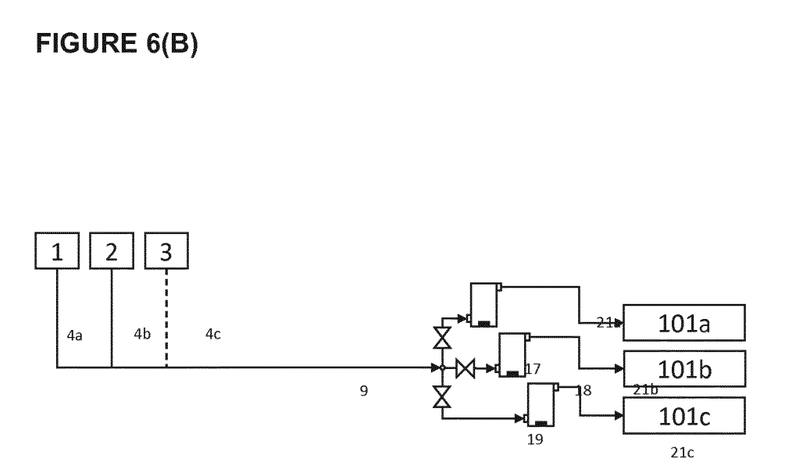

The arrangement shown in FIG. 6(*a*) provides feedstreams of sulphur (1), urea (2) and optionally a surfactant (3) that pass along feed lines (4*a-c*) and which merge into a combined feedline (9). The combined feedline (9) proceeds to an arrangement comprising a plurality of high shear rotary mixers arranged in parallel. In the embodiment shown in FIG. 6(*a*), a trio of rotary mixers (21*a-c*) is arranged in parallel (i.e. substantially side-by-side) upstream of processing and forming stages (10) where the feed is converted into fertiliser product. Control valves (17-19) allow for the feedstream from the feedline (9) to be diverted as and if required. This additional level of control permits acute management of mixing parameters and is advantageous when the process is required to operate at less than full capacity. A further embodiment of the invention is shown in FIG. 6(*b*) which is substantially similar to the embodiment set out in FIG. 6(*a*) except that the output of the parallel rotary mixers (21*a-c*) is not merged into a single feedline prior to the additional processing and forming stages (10). In the arrangement set out in FIG. 6(*b*) the outputs from the mixers (21*a-c*) are kept separate and proceed to discreet forming/processing stages (101*a-c*). In this way the mixers (21*a-c*) need not all be configured to give an identical output in terms of particle size, particle grade, capacity or other mixing parameters. This affords a level of additional flexibility to the process that enables a plurality of separate and discrete product lines to be derived from a single common feedstream.

It will be appreciated that the present invention further provides for combined arrangements in which static and high shear rotary mixers are arranged in series, in parallel; or in series and in parallel. In so doing, the level of acute control over product grade, process capacity and of heat accumulation within the feedstream can be optimised in order to ensure high homogeneity of product and reduced contamination by thiourea and biuret.

In a further embodiment of the invention, the merging of feedlines (4*a-c*) need not occur simultaneously. Suitably, the major sulphur and urea components can be mixed in a staged manner, firstly by creating a concentrated emulsion of solid elemental sulphur with a solution of urea. Formation of the emulsion can suitably be carried out in one or more than one static mixers arranged in series or in parallel. This step is followed by combination of the concentrated sulphur emulsion with molten urea. Surfactant may be added at either the first or second steps. The advantage of staging the combination of sulphur and urea is that it minimises the period of time for which the urea is maintained at an elevated temperature—thereby reducing biuret formation. This mixing stage can occur upstream of any of the mixing arrangements described above and should be considered as an alternative to the embodiments set out in FIGS. 2-6. An embodiment of this configuration of the invention is shown in FIG. 7.

Figure 7:
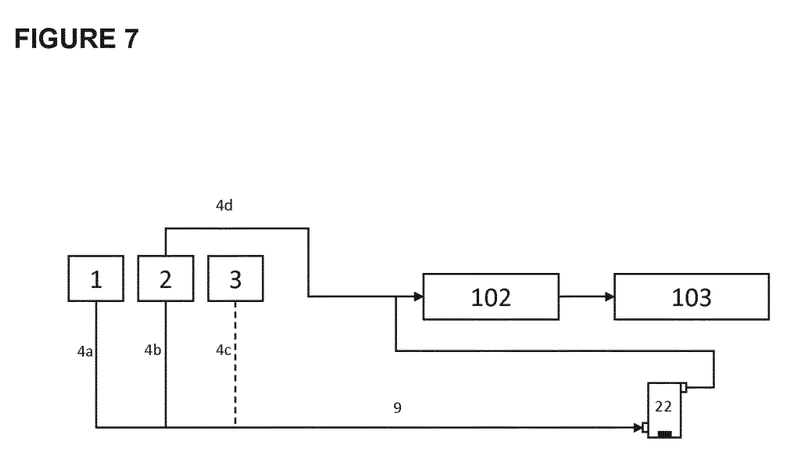
FIG. 7 shows process flow diagrams of a further embodiment of the invention in which a second feed is introduced after an initial mixing stage.

In FIG. 7, feedstreams of sulphur (1), urea (2) and optionally a surfactant (3) that pass along feed lines (4*a-c*) and which merge into a combined feedline (9). The combined feedline (9) proceeds to a rotary mixer (22) so as to provide an initial pre-mix of sulphur urea emulsion. The output of the rotary mixer (22) is then combined with a second urea feedstream (4*d*), suitably comprising molten urea, before proceeding immediately to a mixing stage (102) The mixing stage (102) may comprise one or more static or high shear rotary mixing arrangements, arranged in series or parallel, substantially as described in the embodiments above. The product of the mixing stage (102) then proceeds to further processing and forming stages (103) as required. This embodiment minimises contact between molten urea comprised within the feedline (4*d*) and sulphur comprised within the pre-mix product of the rotary mixer (22), prior to introduction into the mixing stage (102).

Figure 8:
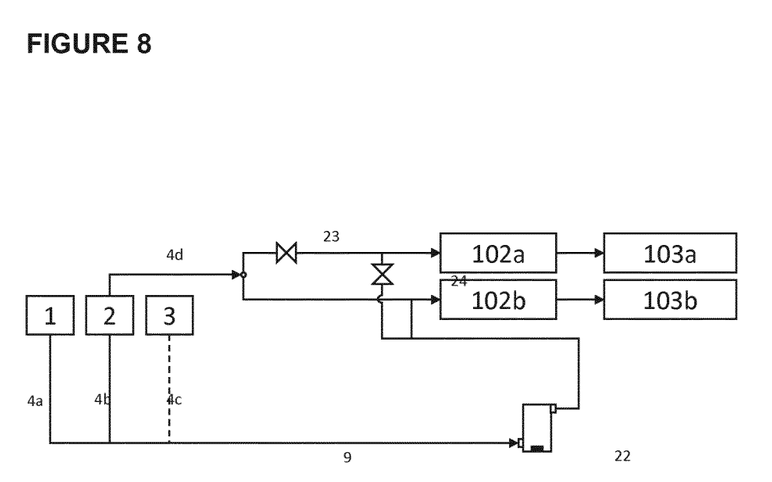
FIG. 8 shows a process of a further embodiment of the invention in which a second feed is introduced after an initial mixing stage together with a plurality of mixers arranged in parallel and where the output from the mixers is not combined and each is processed separately.

FIG. 8 shows a further embodiment of the invention that is similar to that shown in FIG. 7, however, the molten urea feedstream (4*d*) is divided so that multiple mixing and forming stages can be performed (102*a-b*, 103*a-b*). Control valves (23-24) allow for the feedstream from the feedlines (4*d* and 9) to be controlled or stopped as and if required from entering the mixing stage (102*a*). This additional level of control permits acute management of mixing parameters and is advantageous when the process is required to operate at less than full capacity.

The elemental urea-sulphur product obtained according to the embodiments of the invention described above can be suitably subjected to additional processing and forming steps (10, 101*a-c*, 103, 103*a-b*). Additional processing may include drying in a drying unit. In a specific embodiment, the fertiliser is air-dried in the drying unit, thereby avoiding the need for additional drying equipment. Typically, the drying unit is a rotary dryer.

Figure 9:
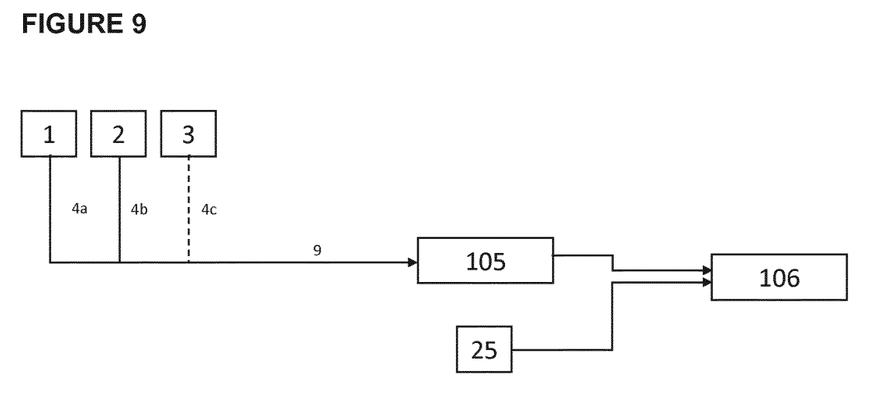
FIG. 9 shows process flow diagrams for a further embodiment of the invention in which a mixed stream prepared by any of the above embodiments is used as a coating and/or fattening agent.

FIG. 9 shows a further embodiment of the invention whereby a feedstreams of sulphur (1), urea (2) and optionally a surfactant (3) that pass along feed lines (4a-c) and which merge into a combined feedline (9. A mixed feed prepared according to any one of the embodiments described previously is prepared (105) and then applied as a coating or a fattening agent to a substrate source (25) within a coating or enrobing assembly (106). In this embodiment, the mixed feed comprising molten urea and molten sulphur, and optionally a surfactant, is fed into a process where it is contacted with solid substrate material to induce surface coating of the solid with the mixed feed. In one specific embodiment of the invention the coating is applied as a fattening agent to urea prills in order to prepare a fertilizer product having a core comprised of mainly urea and an outer coating comprised of a sulphur-urea mix. This embodiment is advantageous as only part of the final product, the mixed coating of urea and sulphur, is subjected to processing in the molten phase. Hence, the formation of additional impurities of biuret and/or thiourea is minimised since the core of the fertilizer pellet has not been subjected to high temperature processing.

According to one embodiment of the invention, it is possible to form granules, prills or pastilles of the composition for use as a fertiliser by employing equipment or apparatus that is designed to refine or further process the product of the mixing process. In a specific embodiment, the pastilles are formed by a rotoform pastillator (Sandvik AB, Sandviken, Sweden). A Rotoform pastillation system consists of a heated cylindrical stator which is supplied with molten or liquid product and a perforated rotating shell that turns concentrically around the stator, depositing drops of the product across the whole operating width of the steel conveyor belt. A system of baffles and internal nozzles comprised within the cylindrical stator provides a uniform pressure across the whole width, providing an even flow through all holes of the perforated outer shell. This ensures that every formed pastille is of a uniform size from one edge of the belt to the other. The belt conveys the deposited pastilles away from the stator and allows them to cool and solidify.

The granulated or pastillated urea-sulphur fertiliser granules may be sorted according to their size in a sorting unit to achieve a more uniform size distribution. Typically, oversized granules are crushed and returned to the sorting unit while undersized granules are returned to the granulator as so-called off-spec fines. A suitable size range for fertiliser granules is from 1.5 to 5.0 mm, more typically from 2 to 4 mm, expressed as the average diameter of the granules. The use of granules which fall within this range is more likely to enable a more even distribution of the fertiliser ingredients in the soil after applying the granules to the soil.

In an alternative embodiment of the invention, the product of the mixer stage they be further processed to incorporate other fertiliser components. By way of non-limiting example, it is an option to combine the urea-sulphur fertiliser with other active agents including phosphate, nitrogen, and potassium. In a specific embodiment of the invention, the output of the mixer stage is provided in a feedstream that leads directly to an NPK synthesis plant for further processing into enhanced fertiliser composition.

It will be appreciated by the skilled person that various modifications, combinations, substitutions and alterations can be made to the processes that are described above without deviating from the invention as described herein, or from the scope of the claims that follow.

That which is claimed is:

1. A process for the manufacture of a urea-sulphur fertiliser composition, the process comprising:
   (a) providing a first feed comprising elemental sulphur, and a second feed comprising urea;
   (b) combining the first feed and the second feed to obtain a combined feed;
   (c) passing the combined feed through at least three mixers arranged in a parallel configuration to obtain a mixed feed; and
   (d) processing and forming the mixed feed to obtain a granular urea-sulphur fertiliser product comprising from 1 wt % to 40 wt % sulfur based on the total weight of the granular urea-sulphur fertiliser product.

2. The process of claim 1, wherein the mixers are selected from the group consisting of a static mixer and a dispersion mill.

3. The process of claim 2, wherein step (a) comprises providing a third feed that comprises a multifunctional ionic surfactant.

4. The process of claim 3, wherein the mixers are selected from the group consisting of a static mixer and a dispersion mill.

5. The process of claim 1, wherein the process further comprises: adding one or more plant micronutrients to the combined feed or mixed feed, wherein the plant micronutrients are one or more selected from the group consisting of boron; selenium; sodium; zinc; manganese; iron; copper; molybdenum; cobalt; calcium; and magnesium.

6. The process of claim 5, wherein the first feed is in liquid form and the second feed is in liquid form.

7. A process for the manufacture of a urea-sulphur fertiliser composition, the process comprising:
   (a) providing a first feed comprising elemental sulphur, and a second feed comprising urea;
   (b) combining the first feed and the second feed to obtain a combined feed;
   (c) passing the combined feed through at least three mixers arranged in a series configuration to obtain a mixed feed; and
   (d) processing and forming the mixed feed to obtain a granular urea-sulphur fertiliser product.

* * * * *